(12) United States Patent
Lee

(10) Patent No.: US 8,942,681 B2
(45) Date of Patent: Jan. 27, 2015

(54) MULTIPARTY CALL PROCESSING METHOD AND APPARATUS FOR MOBILE TERMINAL

(75) Inventor: Kwang Min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 772 days.

(21) Appl. No.: 12/437,840

(22) Filed: May 8, 2009

(65) Prior Publication Data

US 2009/0286522 A1 Nov. 19, 2009

(30) Foreign Application Priority Data

May 15, 2008 (KR) .................. 10-2008-0044918

(51) Int. Cl.
- *H04M 3/42* (2006.01)
- *H04M 1/00* (2006.01)
- *H04W 76/00* (2009.01)
- *H04W 88/06* (2009.01)

(52) U.S. Cl.
CPC ............ *H04W 76/002* (2013.01); *H04W 88/06* (2013.01)
USPC ..... 455/416; 455/417; 455/552.1; 455/553.1; 455/461; 379/211.01; 379/211.02

(58) Field of Classification Search
CPC ..... H04M 3/54; H04M 1/72519; H04M 3/56; H04M 1/006; H04M 1/72513; H04M 2207/18; H04M 3/436; H04M 3/533; H04M 2203/5018; H04M 2250/62; H04M 3/42187; H04M 3/42246; H04M 3/428; H04M 3/465; H04W 4/16; H04W 88/06; H04W 92/02; H04W 84/12
USPC ................ 455/552.1–553.1, 461, 517–521, 455/416–417; 379/211.01–212.01
See application file for complete search history.

(56) References Cited

U.S. PATENT DOCUMENTS

| | | | | |
|---|---|---|---|---|
| 5,920,812 A | * | 7/1999 | Palviainen | ..... 455/417 |
| 6,167,256 A | * | 12/2000 | Yla-Outinen et al. | ..... 455/417 |
| 6,381,323 B1 | * | 4/2002 | Schwab et al. | ..... 379/211.02 |
| 6,473,611 B2 | * | 10/2002 | Hurme | ..... 455/410 |
| 6,501,948 B1 | * | 12/2002 | Salin | ..... 455/417 |
| 6,577,721 B1 | * | 6/2003 | Vainio et al. | ..... 379/202.01 |

(Continued)

FOREIGN PATENT DOCUMENTS

| | | |
|---|---|---|
| KR | 1020060117698 | 11/2006 |
| KR | 100802127 B1 | 2/2008 |
| WO | 2005/051013 | 6/2005 |

OTHER PUBLICATIONS

Korean Office Action dated Jul. 28, 2010 for Korean Patent Application No. 119981042713, which corresponds to U.S. Appl. No. 12/437,840.

(Continued)

*Primary Examiner* — Matthew Sams
(74) *Attorney, Agent, or Firm* — H.C. Park & Associates, PLC

(57) ABSTRACT

A multiparty call processing method and mobile terminal implemented with the multiparty call processing method is provided. A multiparty call processing method for a mobile terminal detects a call request to a first network, determines whether the mobile terminal is in a full state of the first network, and sends a call request message to a second network when the mobile terminal is in the full state of the first network.

7 Claims, 10 Drawing Sheets

(56) References Cited

U.S. PATENT DOCUMENTS

| | | | |
|---|---|---|---|
| 6,611,682 B1* | 8/2003 | Projtz | 455/417 |
| 6,741,849 B1* | 5/2004 | Verkama et al. | 455/406 |
| 7,142,852 B2* | 11/2006 | Tell et al. | 455/426.2 |
| 7,376,112 B2* | 5/2008 | Liu | 370/338 |
| 7,558,590 B2* | 7/2009 | Baudino et al. | 455/518 |
| 2001/0011016 A1* | 8/2001 | Chambers | 455/417 |
| 2001/0023183 A1* | 9/2001 | Palviainen et al. | 455/417 |
| 2001/0041557 A1* | 11/2001 | Hurme | 455/410 |
| 2002/0077091 A1* | 6/2002 | Immonen et al. | 455/417 |
| 2003/0073430 A1* | 4/2003 | Robertson et al. | 455/416 |
| 2004/0264410 A1 | 12/2004 | Sagi et al. | |
| 2005/0124326 A1* | 6/2005 | Belkin et al. | 455/414.1 |
| 2006/0234693 A1* | 10/2006 | Isidore et al. | 455/422.1 |
| 2007/0115961 A1 | 5/2007 | Dorenbosch et al. | |
| 2007/0123285 A1 | 5/2007 | Baudino et al. | |
| 2009/0291675 A1* | 11/2009 | Wu et al. | 455/416 |

OTHER PUBLICATIONS

European Search Report for corresponding EP Application No. 09159464.8-1249 dated Jun. 21, 2012.

* cited by examiner

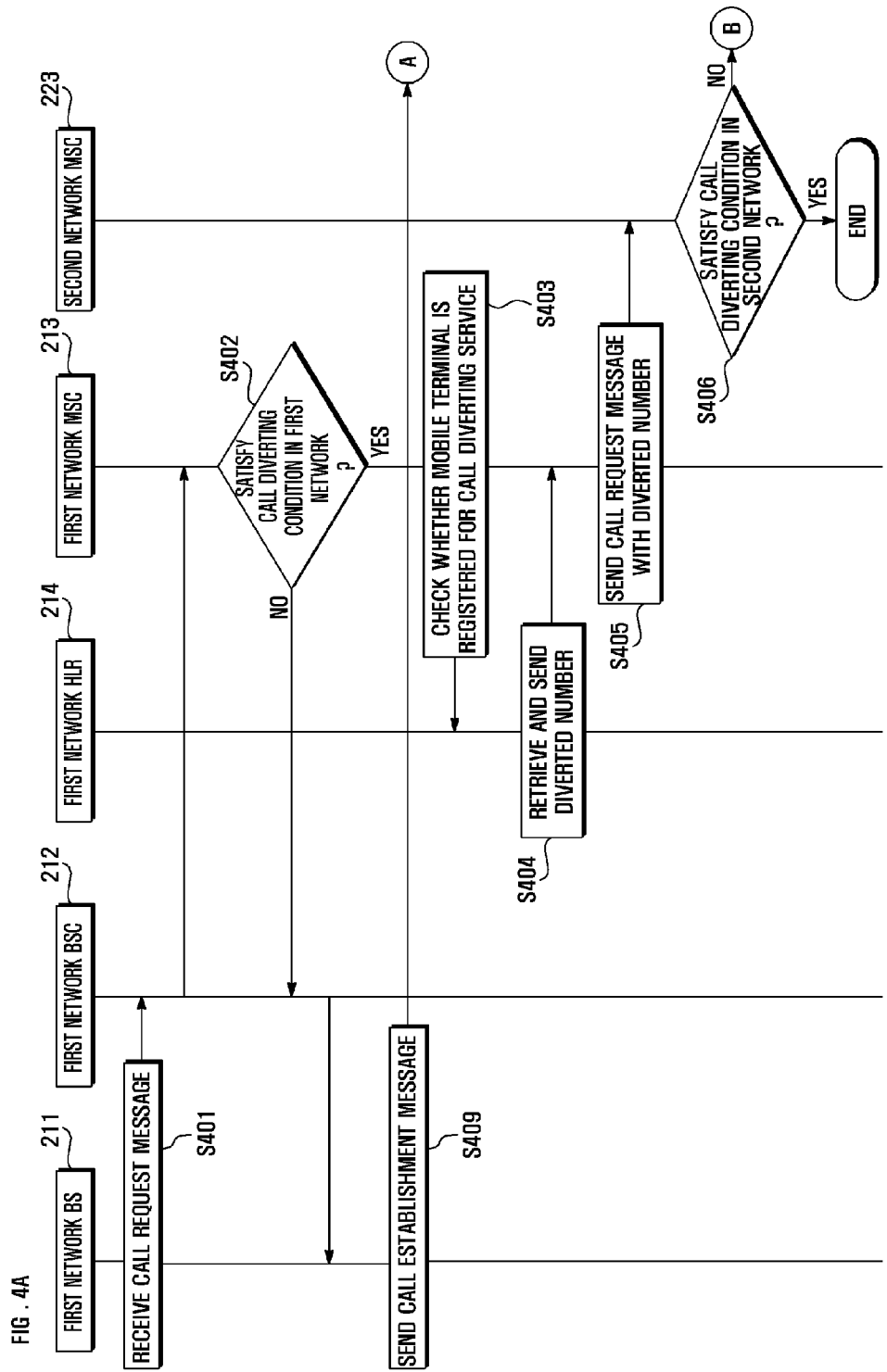

MULTIPARTY CALL PROCESSING METHOD AND APPARATUS FOR MOBILE TERMINAL

CROSS REFERENCE TO RELATED APPLICATION

This application claims priority from and the benefit of Korean Patent Application No. 10-2008-0044918, filed on May 15, 2008, which is hereby incorporated by reference for all purposes as if fully set forth herein.

BACKGROUND OF THE INVENTION

1. Field of the Invention

The present invention relates to a multiparty call service and, in particular, to a multiparty call processing method and mobile terminal implemented with a multiparty call processing method that can make and receive a call when the mobile terminal is participating in a multiparty call using a dual standby feature of a mobile terminal.

2. Discussion of the Background

A multiparty call is a network service that allows more than two subscribers to simultaneously take part in a multiparty or conference call. Since it allows interactive communication among several participants, the multiparty call service is an efficient and time-conserving conference means. Recently, the multiparty call has been used in many businesses and has become popular even among individuals. The multiparty call service may be implemented over a wireless communication network as well as over a wired network. Currently, most cellular communication systems (such as the Code Division Multiple Access (CDMA) system, the Wideband CDMA (WCDMA) system, the General System for Mobile communications (GSM), and the Universal Mobile Telecommunications System (UMTS) system) provide a multiparty call service.

However, the conventional multiparty call service provides for a mobile terminal to take part in only a limited number of multiparty call groups simultaneously and also provides for only a limited number of participants to take part in a multiparty call. That is, the multiparty call service may be provided with a maximum number of call groups or a maximum number of participants.

For this reason, in order for a subscriber participating in the maximum number of multiparty call groups or in a multiparty call with a maximum number of participants to make or receive another call, the subscriber may have to disjoin one of the multiparty call groups or release a connection of one of the participants joined in the multiparty call. Such a situation may make the subscriber uncomfortable, especially when there is a need to make or receive an urgent call (or an emergency call) in the middle of the multiparty call session. Also, in order for a disjoined participant to rejoin the multiparty call after the completion of the urgent call, it may be necessary to call to another participant of the multiparty call, and the attempt to rejoin may fail due to the joining of a new participant during the ex-participant's absence. Furthermore, the user may fail to receive an urgent call (or emergency call) in the middle of a multiparty call session due to the limitation of the available connection channels. Accordingly, there is a need for an efficient multiparty call processing technique.

SUMMARY OF THE INVENTION

The present invention provides a multiparty call processing method and an apparatus for a mobile terminal that may make or receive a call when the mobile terminal is participating in a maximum number of multiparty call groups or in a multiparty call in which a maximum number of participants are joined using a dual standby feature of the mobile terminal.

Additional features of the invention will be set forth in the description which follows, and in part will be apparent from the description, or may be learned by practice of the invention.

The present invention discloses a multiparty call processing method for a mobile terminal includes detecting a call request to a first network, determining whether the mobile terminal is in a full state to the first network, and sending a call request message to a second network when the mobile terminal is in the full state to the first network.

The present invention also discloses a multiparty call service method for a mobile terminal including determining whether a call status of the mobile terminal satisfies a call diverting condition when a first network receives a call request message sent to the mobile terminal, sending the call request message with a diverted number of the mobile terminal from the first network to a second network when the call status of the mobile terminal satisfies the call diverting condition, and sending the call request message with the diverted number from the second network to the mobile terminal.

The present invention also discloses a mobile terminal including a first radio frequency unit to interface with a first network, a second radio frequency unit to interface with a second network, a first subscriber identity card that contains subscriber information for the first network, a second subscriber identity card that contains subscriber information for the second network, and a control unit. The control unit controls the first radio frequency unit and the second radio frequency unit to stand by simultaneously, determines whether the mobile terminal is in a full state to one of the first network and the second network, and sends, when the mobile terminal is in the full state to one of the first network and the second network, a call request to the other network of the first network and the second network that the mobile terminal is not in the full state to.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 4A and FIG. 4B are message flow diagrams showing a multiparty call reception procedure of a multiparty call processing method according to an exemplary embodiment of the present invention.

DETAILED DESCRIPTION OF THE ILLUSTRATED EMBODIMENTS

Figure 1:
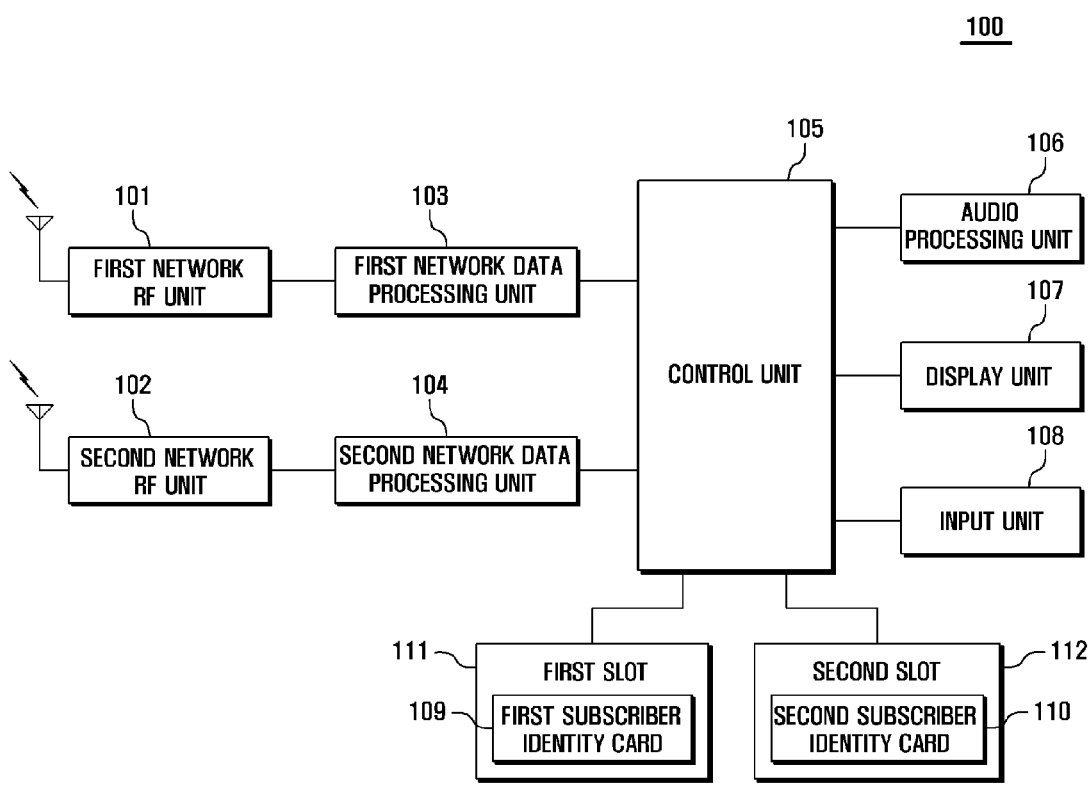
FIG. 1 is a block diagram showing a configuration of a dual standby mobile terminal according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

In the following description, a dual standby mobile terminal is a communication terminal supporting two different communication systems simultaneously. The dual standby mode terminal operates with two Subscriber Identity Module (SIM) and/or Universal SIM (USIM) cards so as to guarantee the number standby on two different networks at the same time. This means that the dual standby mobile phone allows a call to be made in one network while maintaining another call in another network.

"Call diverting" or "call forwarding" is a function in which, when a call to a specific number fails (because the called party's mobile terminal is off or out of reach or the line is busy), the call is delivered to any other number registered by the called party.

"Full state" is a state in which a mobile terminal takes part in a maximum number of multiparty call groups or in a multiparty call in which a maximum number of participants are joined. For example, when the exemplary maximum multiparty call group number set as 2, a subscriber A can set up a multiparty group call with subscribers B and C and another multiparty group call with subscribers D and E. On the other hand, when the exemplary maximum multiparty call participant number set as 6, a subscriber A may participate in a multiparty call with subscribers B, C, D, E, F, and G.

FIG. 1 is a block diagram showing a configuration of a dual standby mobile terminal according to an exemplary embodiment of the present invention.

Referring to FIG. 1, the mobile terminal 100 includes a first network radio frequency (RF) unit 101, a second network RF unit 102, a first network data processing unit 103, a second network data processing unit 104, a control unit 105, an audio processing unit 106, a display unit 107, an input unit 108, a first subscriber identity card 109, a second subscriber identity card 110, a first slot 111, and a second slot 112.

The first and second network RF units 101 and 102 are responsible for radio communication with the base stations of respective first and second networks. Each of the first and second network RF units 101 and 102 includes an RF transmitter to up-convert and amplify the transmission signal and an RF receiver to low noise amplify and down-convert the received signal.

The first network data processing unit 103 includes a transmitter to encode and modulate the transmission signal and a receiver to demodulate and decode the received signal for the first network. The first network data processing unit 103 may also include a modem and a codec. The second network data processing unit 104 may be configured and may operate for the second network in the same manner as the first network data processing unit 103 for the first network.

The control unit 105 controls general operations of the mobile terminal 100 and communications with the first and second networks. Particularly in this exemplary embodiment, the control unit 105 controls such that the mobile terminal 100 keeps standby modes for both the first and second network simultaneously, checks whether one of the first and second network is in the full state, and makes a call to the first or second network when the other of the first and second network is in the full state. The control unit 105 may be implemented in the form of a signal chipset integrating the first and second network data processing units 103 and 104. For example, the control unit 105 may be a CDMA Mobile Station Modem (MSM). In this exemplary embodiment, the first and second network data processing units 103 and 104 are spaced apart from the control unit 105.

The audio processing unit 106 may be provided with a microphone and a speaker and processes audio signals. Particularly in this exemplary embodiment, when one of the first and second networks is in the full state, the audio processing unit 106 outputs an alarm sound through the speaker under the control of the control unit 105.

The display unit 107 may include a liquid crystal display (LCD) panel to display various visual data and operation status of the mobile terminal 100. Particularly in this exemplary embodiment, when one of the first and second networks is in the full state, the display unit 107 outputs an alarm message under the control of the control unit 105.

The input unit 108 may be implemented with at least one of a keypad, a touchscreen, and a touchpad to receive commands input by the user. Particularly in this exemplary embodiment, the input unit 108 is configured for the user to set the call diverting function.

The first and second subscriber identity cards 109 and 110 are issued and managed by telecommunication providers. The first subscriber identity card 109 contains a user's subscription information for the first network. In this exemplary embodiment, the mobile terminal 100 connects to the first network using the information contained in the first subscriber identity card 109 and stands by at the frequency of the first network. The second subscriber identity card 110 contains the user's subscription information for the second network. The mobile terminal 100 connects to the second network using the information contained in the second subscriber identity card 110 and stands by at the frequency of the second network. The first and second subscriber identity cards 109 and 110 are inserted into the first and second slots 111 and 112, respectively.

Figure 2:
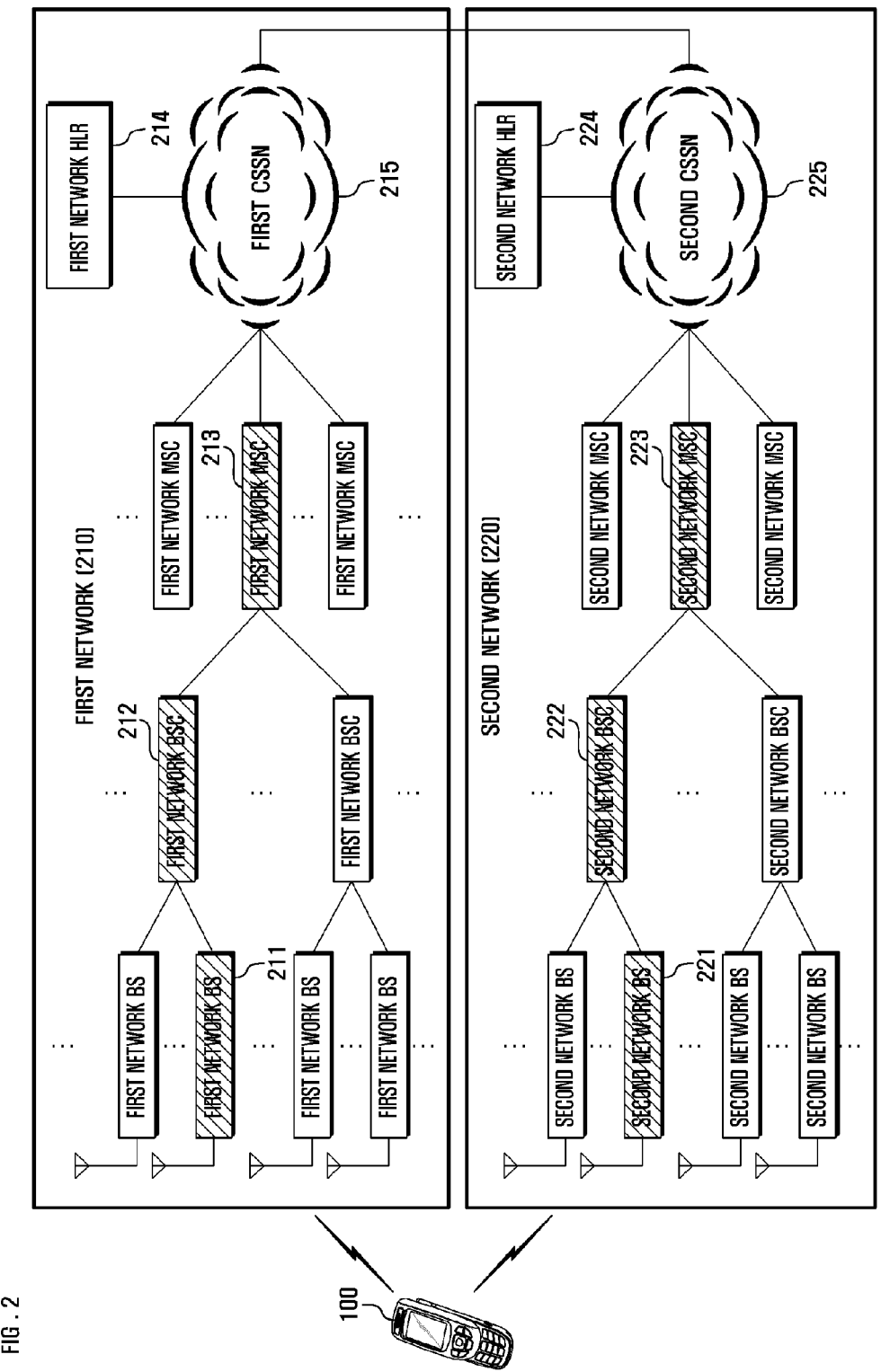
FIG. 2 is a diagram showing the system architecture of the first and second networks associated with the mobile terminal of FIG. 1.

FIG. 2 is a diagram showing the system architecture of the first and second networks associated with the mobile terminal 100 of FIG. 1.

Referring to FIG. 2, the communication system includes a first network 210 and a second network 220. The first network 210 includes a plurality of first network Base Stations (BSs) 211, a plurality of first network Base Station Controllers (BSCs) 212, a plurality of Mobile Switching Centers (MSCs) 213, a first network Home Location Register (HLR) 214, and a first Common Channel Signaling No. 7 Network (CSSN) 215. The second network 220 includes a plurality of second network BSs 221, a plurality of second network BSCs 222, a plurality of second network MSCs 223, a second network HLR 224, and a second CSSN 225.

The first network BSs 211 define individual cells and relay calls. The first network BSCs 212 control the first network BSs 211 and perform call processing under the control of the first network MSCs 213. The first network MSCs 213 are responsible for switching the calls of the mobile terminals among the first network BSs 211 and establishing a connection to another network. In this exemplary embodiment, the first network MSCs 213 are connected to the second network MSCs 223 via the first and second CSSNs 215 and 225. The first network HLR 214 is a database to store and manage the first network subscribers' information and location information of the mobile terminals registered with the first network 210. The second network BSs 221, the second network BSCs 222, the second network MSCs 223, the second network HLR 224, and a second CSSN 225 are structured and operate in the same manner as those of the first network 210.

The first CSSN 215 and the second CSSN 225 are dedicated networks to exchange control signals between the MSCs 213 and 223.

Figure 3:
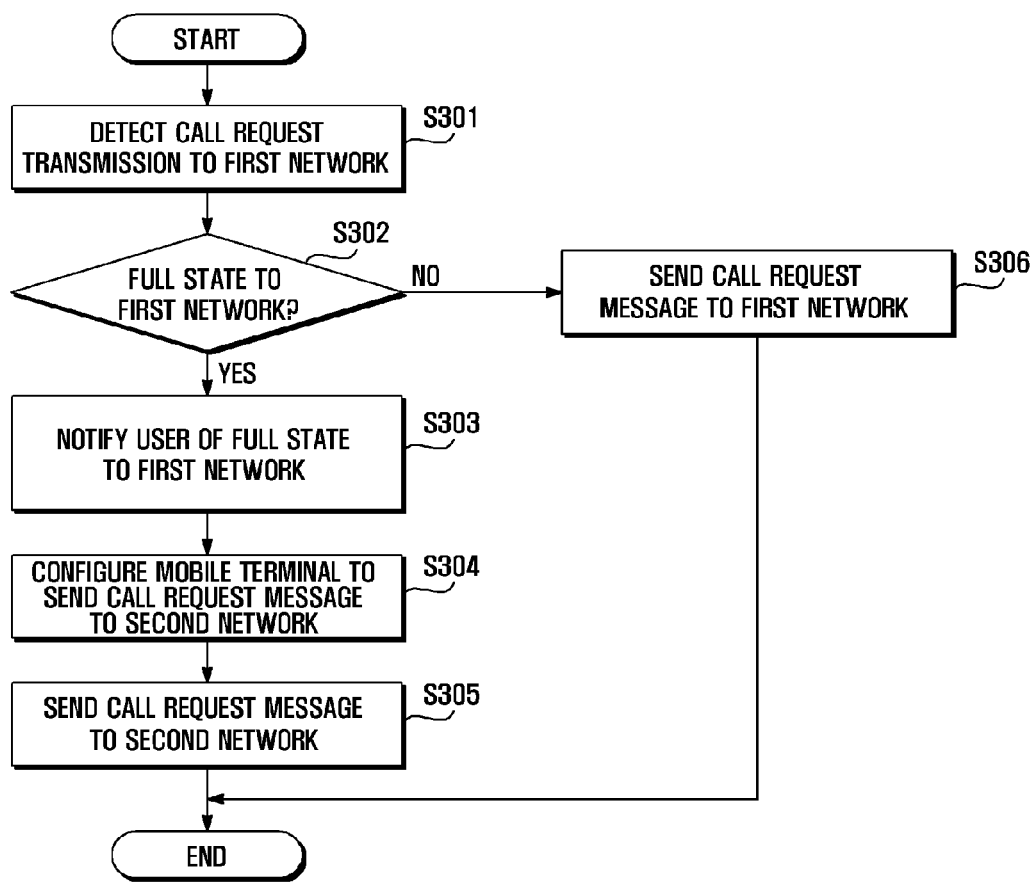
FIG. 3 is a flowchart showing a multiparty call processing method for a dual standby mobile terminal according to an exemplary embodiment of the present invention.

FIG. 3 is a flowchart showing a multiparty call processing method for a dual standby mobile terminal 100 according to an exemplary embodiment of the present invention.

Referring to FIG. 3, the control unit 105 first detects a call request transmission command input by the user to transmit a call request message to a first network BS 211 (S301). Once the call request transmission command is detected, the control unit 105 determines whether the mobile terminal 100 is in the full state to the first network 210 (S302). At this time, the control unit 105 checks the number of multiparty call groups and the number of participants involved in each multiparty call and determines whether the number of multiparty call groups is equal to the maximum number of multiparty call groups or whether the number of participants is equal to the maximum number of multiparty call participants. The multiparty call group is a group of participants involved in a multiparty call through one channel simultaneously, and the multiparty call participants are all the parties involved in each multiparty call.

If the first network 210 is in the full state, then the control unit 105 outputs an alarm to inform the user of the full state of the first network 210 (S303). Next, the control unit 105 configures the mobile terminal 100 such that the call request message is transmitted to the second network 220 (S304). Consequently, the control unit 105 controls the second network data processing unit 104 and the second network RF unit 102 to transmit the call request message to a second network BS 221 (S305). Otherwise, if the first network 210 is not in the full state, then the control unit 105 controls the first network data processing unit 103 and the first network RF unit 101 to transmit the call request message to a first network BS 211 (S306).

Figure 4B:
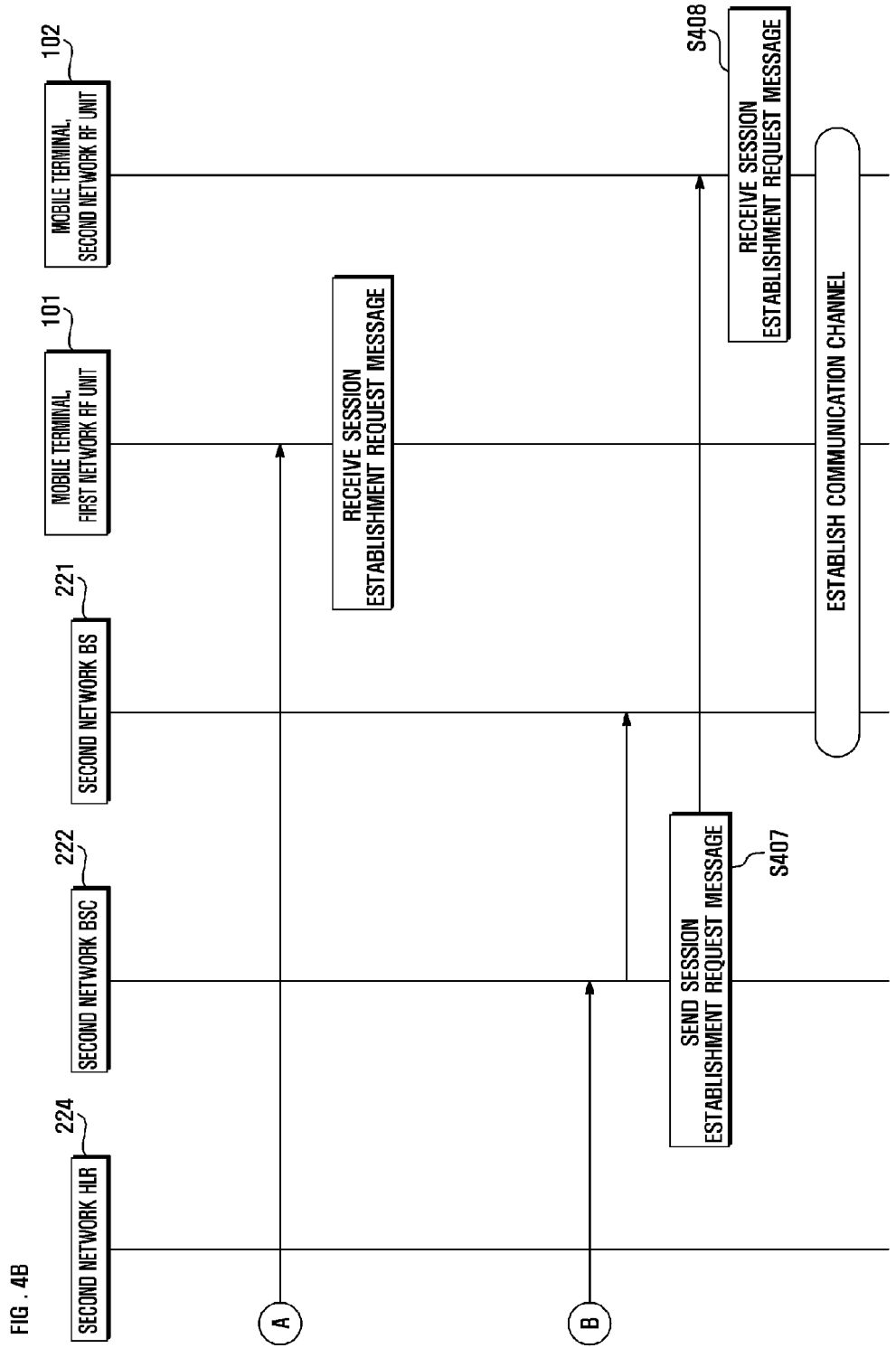

FIG. 4A and FIG. 4B are a message flow diagram showing a multiparty call reception procedure of a multiparty call processing method according to an exemplary embodiment of the present invention.

In order for the mobile terminal 100 participated in a multiparty call to receive another call, a call diverting function should be activated. The call diverting function may be activated by registering a diverted number with a network (e.g. the first network 210) through a call diverting option menu. The call diverting function configuration procedure is described with reference to FIG. 5 and FIG. 6.

When a first network BS 211 receives a call request message transmitted by a terminal by the first network RF unit 101 (S401), the first network BS 211 sends the call request message to a first network MSC 213 via a first network BSC 212. Upon receipt of the call request message, the first network MSC 213 determines whether the terminal status satisfies a call diverting condition (S402). Here, the call diverting condition is satisfied when a terminal is on the busy line, no answer, out of the service area, or in a full state. The full state refers to a state in which the mobile terminal has participated in the maximum number of multiparty party call groups or in a multiparty call of which the maximum number of participants have joined. A multiparty call group is composed of subscribers participating in a multiparty call through the same channel simultaneously.

If it is determined that the terminal is in the full state, then the first network MSC 213 requests the first network HLR 214 to check whether the terminal is registered for the call diverting service (S403). If the terminal is registered for the call diverting service, the first network HLR 214 retrieves a diverted number stored with the information on the terminal in the registration process and sends the diverted number to the first network MSC 213 (S404). Upon receipt of the diverted number, the first network MSC 213 sends the call request message and the diverted number to a second network MSC 223 via the first and second CSSNs 215 and 225 (S405). If the call request message is received together with the diverted number, the second network MSC 223 determines whether the terminal satisfies a call diverting condition in the second network 220 (S406). If the terminal does not satisfy the call diverting condition in the second network 220, then the second network MSC 223 sends a session establishment request message to the second network RF unit 102 of the terminal via the second network BSC 222 and a second network BS 221 (S407). Upon receipt of the session establishment request message (S408), the terminal establishes a communication channel with the second network BS 221 by the second network RF unit 102.

Returning to step S402, if the terminal does not satisfy the call diverting condition in the first network 220, then the first network MSC 213 sends a session establishment request message such that the terminal receives the session establishment request message, using the first network RF unit 101, via the first network BSC 212 and the first network BS 211 (409). Upon receipt of the session establishment request message, the terminal establishes a communication channel with the first network BS 211.

If the terminal satisfies the call diverting condition in the second network 220, the call processing procedure is terminated.

Figure 5:
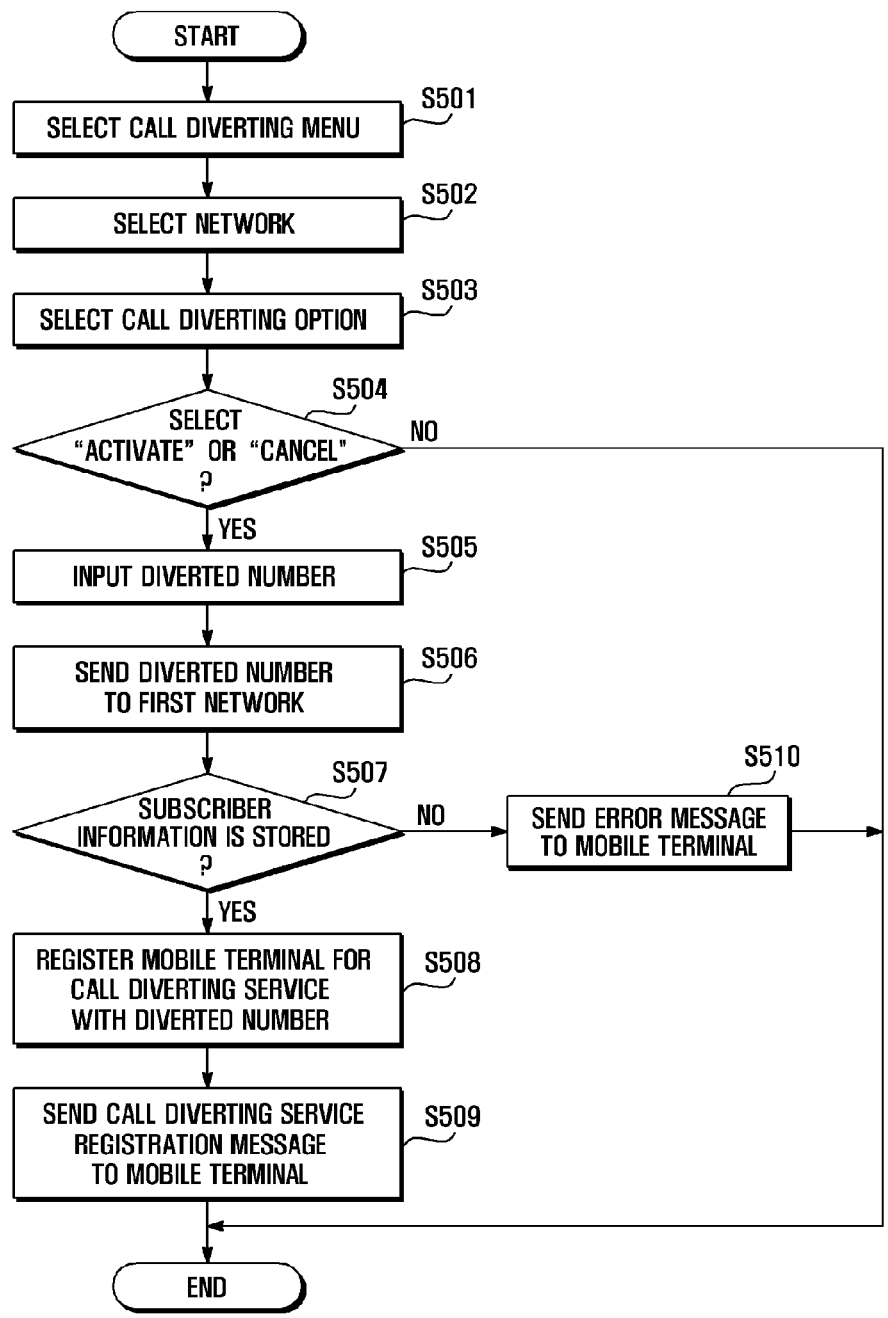
FIG. 5 is a flowchart showing a call diverting function configuration procedure of a multiparty call processing method according to an exemplary embodiment of the present invention.

FIG. 5 is a flowchart showing a call diverting function configuration procedure of a multiparty call processing method according to an exemplary embodiment of the present invention.

Figure 7A:
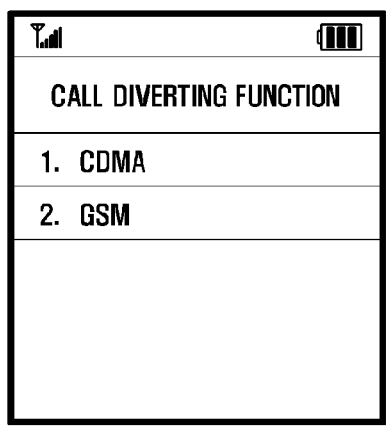
FIG. 7A is a diagram showing a network selection screen displayed in the call diverting function configuration procedure of FIG. 5.

Referring to FIG. 5, the control unit 105 first detects a call diverting menu selection command input by the user (S501). Upon detection of the call diverting menu selection command, the control unit 105 controls the mobile terminal 100 such that a network selection screen is displayed on the display unit 107 in order for the user to select one of the first and second networks 210 and 220 (S502). Here, the first and second networks 210 and 220 can be two networks among WCDMA, GSM, CDMA, and UMTS networks. In this exemplary embodiment, the first network is a CDMA network and the second network is a GSM network, and FIG. 7A is a diagram showing the network selection screen listing CDMA as the first network and GSM as the second network. In this exemplary embodiment, the call diverting function configuration is described in an exemplary case that the first network is selected on the network selection screen.

Figure 7B:
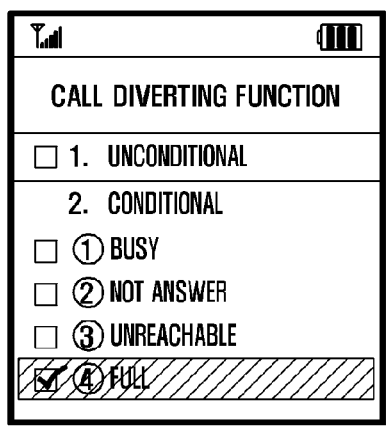
FIG. 7B is a diagram showing a call diverting option screen displayed in the call diverting function configuration procedure of FIG. 5.
Figure 7C:
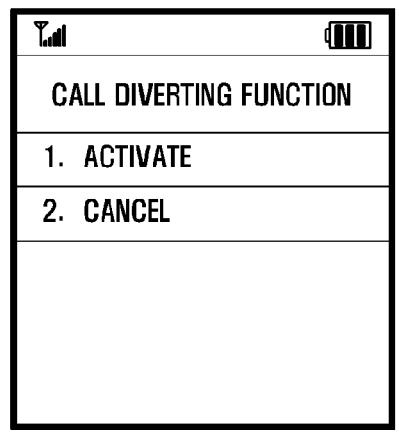
FIG. 7C is a diagram showing a call diverting function activation screen displayed in the call diverting function configuration procedure of FIG. 5.
Figure 7D:
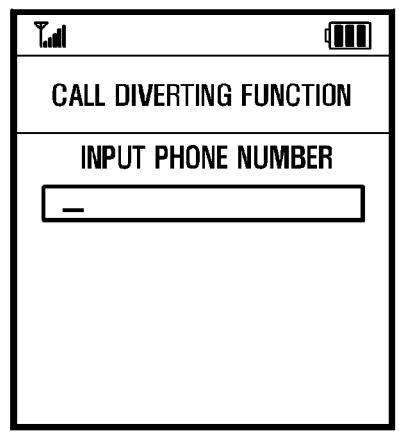
FIG. 7D is a diagram showing a diverted number setting screen displayed in the call diverting function configuration procedure of FIG. 5.

Once the first network is selected at step S502, the control unit 105 controls such that a call diverting option screen, such as that shown in FIG. 7B, is displayed on the display unit 107 in order for the user to configure the call diverting options on the call diverting option screen (S503). Here, the call diverting options include "unconditional" and "conditional," and the conditional options lists condition items "busy," "not answer," "unreachable," and "full." When the unconditional option is checked, a first network incoming call is diverted to the second network unconditionally. Otherwise, when the conditional option is checked, the first network call is diverted to the second network when the conditions checked below the conditional option are satisfied. Once the call diverting option settings has completed, the control unit 105 controls the mobile terminal 100 such that a call diverting function activation screen is displayed on the display unit 107 in order for the user to activate the call diverting function with the current settings or cancel the call diverting functions (S504). Here, the call diverting function activation screen is provided with "Activate" and "Cancel" options, and FIG. 7C is a diagram showing the call diverting function activation screen listing the "Activate" option and the "Cancel" option. If the "Activate" option is selected, then the call diverting function is activated with the current settings. Otherwise, if the "Cancel" option is selected, the call diverting function is disabled. In this exemplary embodiment, the call diverting function configuration is described in an exemplary case that the "Activate" option is selected in the call diverting function activation screen. If the "Activate" option is selected in the call diverting function activation screen, the control unit 105 displays a diverted number setting screen, as shown in FIG. 7D, so the user may input a phone number to which the call is diverted (S505). Otherwise, if the "Cancel" option is selected in the call diverting function activation screen, the diverting call configuration procedure is terminated. Once a diverted number is input through the diverted number setting screen, the control unit 105 controls the mobile terminal 100 such that the diverted number is transmitted to the first network BS 211 (S506).

The diverted number may be transmitted together with other information such as the conditions checked in the call diverting option screen. The diverted number is transmitted to the first network MSC 213 via the first network BS 211 and the first network BSC 212. If the diverted number is received, the first network MSC 213 verifies the identity of the subscriber by requesting the first network HLR 214 to send the subscriber information and determining whether the subscriber information is stored in the first network HLR 214 (S507). If the subscriber's identity is verified, the first network MSC 213 requests that the first network HLR 214 register the mobile terminal 100 for the call diverting service with the diverted number (S508). Finally, the first network MSC 213 sends a call diverting service registration message to the mobile terminal 100 via the first network BSC 212 and the first network BS 211 (S509). If the subscriber's identity cannot be verified at step S507, the first network MSC 213 sends an error message to the mobile terminal 100 (S510).

The call diverting service registration message and error message are received by the first network RF unit 101 of the mobile terminal 100.

Figure 6:
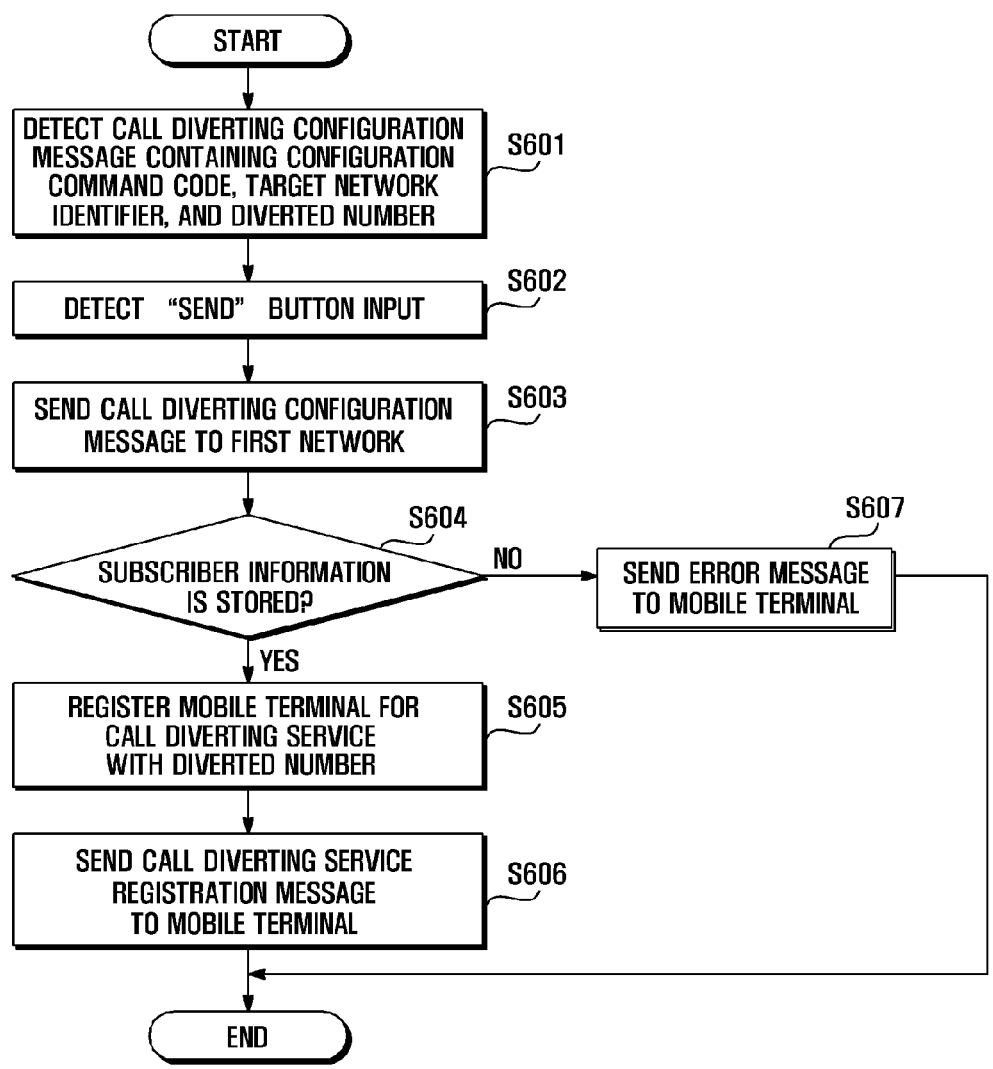
FIG. 6 is a flowchart showing a call diverting function configuration procedure of a multiparty call processing method according to another exemplary embodiment of the present invention.

FIG. 6 is a flowchart showing a call diverting function configuration procedure of a multiparty call processing method according to another exemplary embodiment of the present invention.

Referring to FIG. 6, the control unit 105 detects a call diverting configuration message containing a configuration command code, a target network identifier, and a diverted number (S601), and then detects a "send" button input (S602). When the target network is the first network, the control unit 105 sends the call diverting configuration message to the first network MSC 213 via the first network BS 211 and the first network BSC 212 (S603).

Figure 7E:
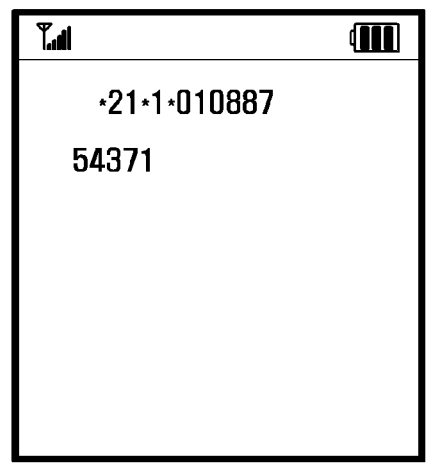
FIG. 7E is a diagram showing a call diverting configuration message screen displayed in the call diverting function configuration procedure of FIG. 6.

If the call diverting configuration message is received, the first network MSC 213 verifies the identity of the subscriber by requesting the first network HLR 214 to send the subscriber information and determining whether the subscriber information is stored in the first network HLR 214 (S604). If the subscriber's identity is verified, the first network MSC 213 requests the first network HLR 214 to mobile terminal 100 for the call diverting service with the diverted number (S605). Finally, the first network MSC 213 sends a call diverting service registration message to the mobile terminal 100 via the first network BSC 212 and the first network BS 211 (S606). If the subscriber's identity cannot be verified at step S604, the first network MSC 213 sends an error message to the mobile terminal 100 (S607). FIG. 7E is a diagram showing a call diverting configuration message to be transmitted to the first network. The call diverting configuration message is composed of a configuration command code "*21," a target network identifier "*1," and a diverted number "*01088754371."

As described above, the multiparty call processing method and apparatus for a dual standby mobile terminal enables the mobile terminal to make or receive a call, even when the mobile terminal is participating in a maximum number of multiparty call groups or in a multiparty call in which a maximum number of participants are taking part, using the dual standby features of the mobile terminal. Accordingly, the multiparty call processing method and apparatus may overcome the shortcomings caused due to the limited number of multiparty call groups that may be joined simultaneously and the limited number of participants that may join in a multiparty call. Also, the multiparty call processing method and apparatus of exemplary embodiments of the present invention allows the user to make or receive a call without releasing a current communication link with a multiparty call group or a participant, thereby reducing the probability of missing calls, especially urgent calls.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. A multiparty call processing method for a mobile terminal, comprising:
   detecting a call request to a first network;
   determining whether the mobile terminal is in a full state to the first network by checking whether a number of multiparty call groups is equal to the maximum number of the multiparty call groups or whether a number of participants is equal to the maximum number of multiparty call participants; and sending a call request message corresponding to the call request to a second network when the mobile terminal is determined to be in the full state to the first network.

2. The multiparty call processing method of claim 1, wherein the full state is a state in which the mobile terminal is participating in the maximum number of multiparty call groups simultaneously, and each of the multiparty call groups is a group of terminals participating in a multiparty call through one channel.

3. The multiparty call processing method of claim 1, wherein the full state is a state in which the mobile terminal is participating in a multiparty call in which a maximum number of the multiparty call participants are joined simultaneously, and the multiparty call participants are all participants' terminals participating in the multiparty call.

4. The multiparty call processing method of claim 1, further comprising outputting a notification when the mobile terminal is in the full state to the first network.

5. The multiparty call processing method of claim 1, further comprising setting the mobile terminal to send the call request message to the second network when the mobile terminal is in the full state to the first network.

6. The multiparty call processing method of claim 1, further comprising sending the call request message to the first network when the mobile terminal is not in the full state to the first network.

7. The multiparty call processing method of claim 1, wherein the first network is a Code Division Multiple Access (CDMA) network, a Wideband CDMA (WCDMA) network, a General System for Mobile communications (GSM) network, or a Universal Mobile Telecommunications System (UMTS) network, the second network is a CDMA network, a WCDMA network, a GSM network, or a UMTS network.

* * * * *